United States Patent [19]

Muramatsu et al.

[11] Patent Number: 5,622,555
[45] Date of Patent: Apr. 22, 1997

[54] PROCESS FOR THE PRODUCTION OF DIS-AZO PIGMENT

[75] Inventors: Yoshio Muramatsu; Ataru Chiba; Hitoshi Maki, all of Tokyo, Japan

[73] Assignee: Toyo Ink Manufacturing Co., Ltd., Tokyo, Japan

[21] Appl. No.: 417,112

[22] Filed: Apr. 5, 1995

[30] Foreign Application Priority Data

Apr. 8, 1994 [JP] Japan .................................. 6-070801

[51] Int. Cl.$^6$ .................................. C09B 27/00
[52] U.S. Cl. .................................. 106/496; 106/493
[58] Field of Search .................................. 106/496, 493

[56] References Cited

U.S. PATENT DOCUMENTS

| | | | |
|---|---|---|---|
| 3,991,044 | 11/1976 | Conley | 106/496 |
| 4,894,094 | 1/1990 | Ruff et al. | 106/496 |

FOREIGN PATENT DOCUMENTS

| | | |
|---|---|---|
| 2313003 | 9/1973 | Germany. |
| 473884 | 6/1969 | Switzerland. |
| 1426053 | 2/1976 | United Kingdom. |
| 2140022 | 11/1984 | United Kingdom. |

OTHER PUBLICATIONS

Sumitomo, Patent Abstracts of Japan, unexamined applications C field, vol. 6, No. 127, Jul. 13, 1982, p. 107 C113 of JP 57-53568.

*Primary Examiner*—Mark L. Bell
*Assistant Examiner*—Scott L. Hertzog
*Attorney, Agent, or Firm*—Wenderoth, Lind & Ponack

[57] ABSTRACT

A process for the production of a dis-azo pigment having excellent dispersibility, high tinting strength and high masking strength, by a simple method under an improved working environment, which is improved in a drying step and can omit the pulverization step of a conventional process, the present process comprising (a) a first step of forming an aqueous paste or slurry containing a synthesized dis-azo pigment into fine particles under hot air at 100° to 300° C. for a short period of time within 0.5 hour, and at the same time, removing water from the formed fine particles to form a powder, and (b) a second step of keeping the powder under heat at 50° to 150° C. for 0.5 to 10 hours.

7 Claims, No Drawings

PROCESS FOR THE PRODUCTION OF DIS-AZO PIGMENT

FIELD OF THE INVENTION

The present invention relates to a process for the production of a dis-azo pigment excellent in dispersibility, tinting strength and masking strength, particularly to a process for drying a synthesized dis-azo pigment. Further, the present invention relates to a process for the production of a dis-azo pigment having a product quality equivalent to, or higher than, a dis-azo pigment produced by drying a synthesized dis-azo pigment at a low temperature for hours, while controlling the product quality as required, by utilizing a method of drying the synthesized dis-azo pigment with hot air having a high temperature.

PRIOR ART OF THE INVENTION

A dis-azo pigment is a practically useful organic pigment having a clear color tone and a high tinting strength, and is widely used as a coloring material for an offset ink, a gravure ink, a coating composition, a plastic, and the like.

A dis-azo pigment is generally produced by the steps of synthesizing it in a system containing water as a solvent, filtering and purifying the reaction mixture to obtain a synthesized dis-azo pigment, and drying and pulverizing the synthesized dis-azo pigment. Generally, a dis-azo pigment as a product is obtained by drying the synthesized dis-azo pigment by a batch or continuous method using a shelf-tray dryer or a band dryer at a relatively low temperature for a long time (hours), and pulverizing the so-obtained synthesized dis-azo pigment mass into particles having a diameter of 1 to 300 μm with a variety of pulverization apparatus. That is because a dis-azo pigment generally has low stability to heat. When it is dried at a high temperature, it undergoes a change in the hue and crystal transformation.

Further, when a synthesized dis-azo pigment is dried at a low temperature for a long period of time to obtain a dry powder, particles of the dis-azo pigment undergo aggregation, and the dispersibility thereof is impaired. It is therefore required to pulverize the dry powder, and the drying step also requires a considerable time and a considerable amount of energy.

Further, the drying and pulverization steps handle the dry powder, so that a dust is caused to pollute the working environment. Moreover, due to the handling of the dry powder, it is difficult to clean the production apparatus easily, and it is therefore difficult to apply the productions apparatus to the production of a variety of pigments. For simplifying the drying and pulverization steps and improving the working environment in these steps, attempts are being made to use an apparatus for drying at a relatively high temperature for a relatively short period of time, such as a spray dryer, a fluidized bed dryer or an air-circulating dryer. However, when the drying is carried out at a relatively high temperature for a relatively short period of time, there is obtained only a pigment having a product quality different from that of a pigment obtained by the conventional drying method.

On the other hand, a wet cake is also used for avoiding the problems of a dry pigment, while the resultant pigment has a high water content since the drying step is omitted, although the pigment has excellent dispersibility. As a result, the so-obtained pigment is limited in application and use. For example, when a pigment having a water content of 55% or more is applied to a water-based flexographic printing ink, it is difficult to obtain a required color density. It is also often required to separate the water, and the step therefor requires an additional cost. For example, when a wet cake of a pigment for a printing ink is formed into a printing ink, it is required to separate water by treating a varnish and the wet cake with a flusher, and this step requires a considerable time and considerable labor. Further, handling and transporting the wet cake require industrially irrational procedures.

For overcoming the above problems, JP-A-57-53568 discloses a method in which a wet cake of a pigment is shaped into forms that can be easily dried and the shaped pigment is dried with a band dryer to decrease its water content to 20 to 55%. Basically, however, this pigment still contains water. For using it in a water-based flexographic printing ink, it is not only improved in dispersibility and handling, but also improved in the influence of dust on the working environment. For using it in a printing ink containing an organic solvent, however, it is still required to separate the water, and the wet cake is dried by a conventional method. That is, it is required to dry the wet cake at a high temperature for hours. When the water content is less than 20%, partial aggregates caused by heat are formed and have an adverse effect on the dispersibility. When the water content is more than 55%, the resultant pigment is the same as a wet cake of a pigment. It is therefore very complicated to control the water content in the drying step.

Further, JP-B-5-41674 (G.B. 2140022A, U.S. Pat. No. 4,601,759) discloses a method in which a wet cake of a pigment is dried (specifically up to a water content of 2 to 19%) to such an extent that the dispersibility is not impaired while the particles of the pigment undergo partial aggregation and to such an extent that no dust is caused. However, the dried pigment still contains water, and it is required to separate the water for using the pigment in a printing ink. Further, the wet cake is dried by controlling the apparatus such that the temperature of the cake is in the range of 20° to 50° C. However, since a fluidized or spray dryer using hot air is used as the apparatus, the drying is effected instantaneously, and when this method is applied to the production of a dis-azo pigment, the quality of the pigment as a product is different from the quality of a conventional pigment obtained by drying a synthesized pigment at a low temperature for hours (e.g., with a shelf-tray or band dryer). This is because the conventional process of drying at a low temperature for a long period of time works not only for removing water as originally expected but also presumably for causing a crystal growth, a crystal transformation and some other chemical reaction.

For simplifying the drying and pulverization steps and improving the working environment in these steps, studies are under way for employing an apparatus capable of drying a synthesized dis-azo pigment at a relatively high temperature for a relatively short period of time, such as a spray dryer, a fluidized bed dryer or an air-circulating dryer. As described above, however, the conventional process of drying at a low temperature for a long period of time works not only for removing water as originally expected but also presumably for causing a crystal growth, a crystal transformation and some other chemical reaction, and it is therefore difficult to obtain a dis-azo pigment having a product quality equivalent to that of a conventional dis-azo pigment by drying a synthesized dis-azo pigment at a high temperature for a short period of time.

SUMMARY OF THE INVENTION

It is an object of the present invention to provide a process for the production of a dis-azo pigment having excellent dispersibility, high tinting strength and high masking strength, by a simple method under an improved working environment.

It is anther object of the present invention to provide a process for the production of a dis-azo pigment having a product quality equivalent at least to that of a dis-azo pigment obtained by drying a synthesized dis-azo pigment at a low temperature for a long period of time, by a combination of a step of drying a synthesized dis-azo pigment at a high temperature for a short period of time and a step of keeping the synthesized dis-azo pigment under heat at a relatively low temperature for a relatively long period of time.

It is further another object of the present invention to provide a process fur the production of a dis-azo pigment, which is improved in the drying step and can omit the pulverization step of a conventional process for the production of a dis-azo pigment comprising drying a synthesized dis-azo pigment at a low temperature for a long period of time and pulverizing the dry dis-azo pigment mass.

According to the present invention, there is provided a process for the production of a dis-azo pigment, which comprises the steps of (a) forming an aqueous paste or slurry containing a synthesized dis-azo pigment into fine particles under hot air at 100° to 300° C. for a short period of time within 0.5 hour, and at the same time, removing water from the formed fine particles to form a powder, and (b) keeping the powder under heat at 50° to 150° C. for 0.5 to 10 hours.

DETAILED DESCRIPTION OF THE INVENTION

The process for the production of a dis-azo pigment, provided by the present invention, comprises the first step of forming an aqueous paste or slurry containing a synthesized dis-azo pigment into fine particles under hot air at 100° to 300° C. for a short period of time within 0.5 hour, and at the same, removing water from the formed fine particles to form a powder, and the second step of keeping the powder under heat at 50° to 150° C. for 0.5 to 10 hours.

The dis-azo pigment treated in the present invention is synthesized by coupling a tetrazo solution prepared from benzidine or a benzidine derivative and a coupler solution containing acetoacetanilide or an acetoacetanilide derivative. More specifically, a slurry of the dis-azo pigment is obtained by coupling a tetrazo component such as tetrazotized 3,3'-dichlorobenzidine or tetrazotized 2,2',5,5'-tetrachlorobenzidine and a coupler solution containing acetacetanidle or an acetacetanidle derivative. Examples of the acetoacetoanilide derivative include acetoaceto-o-toluidide, acetaceto-m-xylidide, acetoaceto-o-anisidide, acetoaceto-2,5-dimethoxyanilide, acetaceto-p-anisidine, acetoaceto-2,5-dimethoxy-4-chloroanilide, acetoaceto-o-chloroanilide and 1-phenyl-3-methyl-pyrazolone. Examples of dis-azo pigments obtained from combinations of the above components include C. I. Pigment Yellow 12, 13, 14, 15, 16, 17, 81, 83 and 174, and C.I. Pigment Orange 13. In the present invention, the slurry containing the synthesized dis-azo pigment may contain an anionic, cationic or nonionic surfactant or dispersing agent, and any one of other surface treating agents used in the fields of pigments such as an amine treating agent, a rosin treating agent and a surface treating agent of a varnish for an ink. A coupling reaction mixture is preferably fully washed with water to remove unreacted components before the slurry is dried according to the process of the present invention.

Basically, the water content of the aqueous paste or slurry containing a synthesized dis-azo pigment, used in the present invention, is not specially limited. The term "water content" refers to an amount of water per 1 part of a water-free material (water/water-free material) (to be sometimes referred to a dry weight-based water content). Generally, the above water content of the aqueous paste or slurry is 50 to 1,000% by weight on a dry basis, although it is determined depending upon a combination of the capability of drying the aqueous paste or slurry instantaneously with a high-temperature hot air and apparatus for washing the dis-azo pigment with water and filtering it.

The means of forming fine particles in the present invention includes pulverization, fluidization and spraying. Actually, it is practical to use an apparatus having both a means of forming fine particles and a means of instantaneously removing water with hot air at a high temperature, and this apparatus includes a spray dryer, air-circulating dryer such as "ATRITOR" (Fuji Paudal Co., Ltd.), STEDMAN CAGE MILL (Otska Iron Works, Ltd.), an a roller mill and LOESCHE MILL (Ubc Industries, Ltd.), and fluidized bed dryers such as MICRON DRYER (Hosokawa Micron Corp.) and SPIN FLASH DRYER (Anhydrd Corp.). The temperature of hot air used for the drying is generally 100° to 300° C., preferably 180° to 300° C. The time for the drying does not exceeds 0.5 hours, and it is several seconds to about 5 minutes. The drying conditions vary depending upon an apparatus used and a water content of a pigment paste, and cannot be uniformly limited. The water content of the dry pigment at this stage differs depending upon the composition and particle size of the dis-azo pigment, and is not specially limited. The aqueous paste or slurry is dried until a formed powder is maintained in the state of a powder. Generally, this water content is 0.1 to 5% by weight on a dry basis.

The apparatus for keeping the dried powder at the second step at a low temperature for a long period of time is not specially limited, and it may be any container that can be used for heating the dried powder and keeping it under heat. The temperature for heating the dried powder and keeping it under heat is in the temperature range which is employed for heating in a conventional shelf-tray type or band dryer, i.e., 50° to 150° C., and the temperature for this purpose is 5 to 10 hours. In general, however, the temperature and time are determined depending upon the capability of the apparatus used, and shall not be specially limited.

According to the present invention, an aqueous paste or slurry of a synthesized dis-azo pigment can be instantaneously dried while being formed into fine particles, and can be obtained not as a mass but as a powder which can be handled as a pigment product. Therefore, the present invention can serve to omit the step of pulverizing a mass obtained by drying an aqueous paste or slurry of a synthesized dis-azo pigment at a low temperature for hours in a conventional method. Further, the drying time can be also decreased.

Further, in the present invention, a dis-azo pigment having an intended product quality can be obtained as required, by changing the water content remaining the dis-azo pigment at the time of instantaneously drying an aqueous paste or slurry with hot air at a high temperature and by changing the time and temperature for keeping the dried dis-azo pigment under heat at a low temperature for a long period of time.

The dis-azo pigment obtained by the process of the present invention substantially has no water content, and therefore requires no operation procedures of separating water for use it in a printing ink.

The dis-azo pigment obtained by the process of the present invention is excellent in dispersibility, tinting strength, weather fastness and masking strength, and can be used in a paste, a flash color, a printing color material, a water-based coating composition, a lacquer, a peroxide-curable varnish and a polyurethane varnish. It can be also incorporated into synthetic and natural polymers. The polymers include thermoplastic resins such as polyvinyl chloride, polystyrene, polyethylene, polyester, phenolplast, aminoplast and rubber. Further, it can be also incorporated into natural, regenerated and synthetic fiber materials and organic and inorganic pigments.

The dis-azo pigment obtained according to the process of the present invention may be used in the form of a mixture containing this dis-azo pigment as a colorant. The mixture includes a solid, an elastomer, a paste and a viscoelastomer. For example, the aqueous paste is prepared by adding a wetting agent or a dispersing agent to the pigment and stirring and mixing these in water, or by dispersing the pigment in a dispersing agent, or mixing or kneading the pigment and a dispersing agent, in the presence of water and optionally an organic solvent or an oil. The so-obtained paste can be used for the production, for example, of a flash color, a printing color material, a water-based coating composition, a plastic dispersion and a spinning solution. The dis-azo pigment obtained by the process of the present invention can be incorporated into water, an organic solvent, a non-drying oil, a drying oil, a lacquer, a varnish, plastic and rubber by stirring, roll-stirring, kneading or milling.

EXAMPLES

The present invention will be explained more in detail hereinafter with reference to Examples, in which "part" stands for "part by weight" and "%" stands for "% by weight".

Example 1

2,000 Parts of a pigment paste (water content 300%) of C. I. Pigment Yellow 12 synthesized by a conventional method and fully washed with water was dried with a continuous fluidization dryer under the following conditions.

(Step a)

| Hot air inlet temperature | 200° C. |
| Amount of treated paste | 280 g/minute |
| Water content of dry product | 1.3% |

(Step b)

The resultant dry pigment was placed in a heat-insulation container and heated at 85° C. for 4 hours.

Comparative Example 1

2,000 Parts of a pigment paste (water content 300%) of C. I. Pigment Yellow 12 synthesized by a conventional method and fully washed with water was dried with a continuous fluidization dryer under the following conditions.

| Hot air inlet temperature | 200° C. |
| Amount of treated paste | 280 g/minute |
| Water content of dry product | 1.3% |

Comparative Example 2

2,000 Parts of a pigment paste (water content 300%) of C. I. Pigment Yellow 12 synthesized by a conventional method and fully washed with water was dried with a batch method box dryer under the following conditions.

| Hot air inlet temperature | 90° C. |
| Time for drying | 12 hours |

The resultant dry pigment mass was pulverized into sizes of 200 μm or less with a hammer mill.

Example 2

2,000 Parts of a pigment paste (water content 300%) of C. I. Pigment Yellow 14 synthesized by a conventional method and fully washed with water was dried with a continuous fluidization dryer under the following conditions.

(Step a)

| Hot air inlet temperature | 200° C. |
| Amount of treated paste | 280 g/minute |
| Water content of dry product | 1.1% |

(Step b)

The resultant dry pigment was placed in a heat-insulation container and heated at 85° C. for 4 hours.

Comparative Example 3

2,000 Parts of a pigment paste (water content 300%) of C. I. Pigment Yellow 14 synthesized by a conventional method and fully washed with water was dried with a continuous fluidization dryer under the following conditions.

| Hot air inlet temperature | 200° C. |
| Amount of treated paste | 280 g/minute |
| Water content of dry product | 1.1% |

Example 3

2,000 Parts of a pigment paste (water content 300%) of C. I. Pigment Yellow 83 synthesized by a conventional method and fully washed with water was dried with a continuous fluidization dryer under the following conditions.

(Step a)

| Hot air inlet temperature | 250° C. |
| Amount of treated paste | 280 g/minute |
| Water content of dry product | 1.1% |

(Step b)

The resultant dry pigment was placed in a heat-insulation container and heated at 100° C. for 6 hours.

Comparative Example 4

2,000 Parts of a pigment paste (water content 300%) of C. I. Pigment Yellow 83 synthesized by a conventional method and fully washed with water was dried with a continuous fluidization dryer under the following conditions.

| Hot air inlet temperature | 250° C. |
| Amount of treated paste | 280 g/minute |
| Water content of dry product | 1.1% |

Example 4

2,000 Parts of a pigment paste (water content 300%) of C. I. Pigment Yellow 83 synthesized by a conventional method and fully washed with water was diluted with water to a water content of 730 and dried with a continuous fluidization dryer under the following conditions.

(Step a)

| Hot air inlet temperature | 250° C. |
|---|---|
| Amount of treated paste | 200 g/minute |
| Water content of dry product | 1.5% |

(Step b)

The resultant dry pigment was placed in a heat-insulation container and heated at 100° C. for 6 hours.

Comparative Example 5

2,000 Parts of a pigment paste (water content 300%) of C. I. Pigment Yellow 83 synthesized by a conventional method and fully washed with water was diluted with water to a water content of 730%, and dried with a continuous fluidization dryer under the following conditions.

| Hot air inlet temperature | 250° C. |
|---|---|
| Amount of treated paste | 200 g/minute |
| Water content of dry product | 1.5% |

[Evaluations]

Offset inks containing the pigments obtained in Examples 1 to 4 and Comparative Example 1 to 5 were evaluated for dispersibility, tinting strength and gloss as follows.

Dispersibility

70 Parts of an offset ink vehicle having the following composition was placed in a paper cup.

| Rosin-modified phenolic resin (supplied by Arakawa Chemical Industries, Ltd.) | 50 parts |
|---|---|
| Linseed oil | 20 parts |
| No. 5 solvent (supplied by Nippon Oil Co., Ltd.) | 30 parts |
| Aluminum octylate | 2 parts |

20 Parts of a pigment was added to the vehicle, and the mixture was uniformly stirred to prepare a premix ink. The premix ink was kneaded with a three-roll mill, and the resultant ink was measured for a state of ground pigment with a grind gage (GR value: the smaller the better).

Tinting strength 0.5 Gram of a blue ink was mixed with 10.0 g of a white ink containing titanium oxide to prepare a blue cut ink, and 0.5 g of the full shade ink prepared for the evaluation of dispersibility and 5.0 g of the blue cut ink were mixed to prepare a tinting cut ink. The so-prepared tinting cut ink was sandwiched with triacetate films such that the thickness of the ink was 0.5 mm, and measured for a color with a calorimeter. The obtained data was expressed by H° of CIELAB color specification system (the greater the H° value is, the more bluish the color is, and the lower the tinting strength is).

Gloss

An ink having an adjusted tack of 9.0 to 9.5 was printed solid over an art paper sheet and measured for a gloss with a glossmeter.

Gravure inks containing the pigments obtained in Examples 1 to 4 and Comparative Example 1 to 5 were evaluated for a hue, dispersibility, tinting strength and gloss as follows.

The following composition was charged into a glass bottle together with 150 parts of 3 mmø alumina beads, and the mixture was dispersed with a paint shaker for 90 minutes to prepare a gravure ink sample.

| Pigment | 10 parts |
|---|---|
| Lime rosin varnish | 80 parts |
| Solvent | 10 parts |

Hue

The above-prepared gravure ink was diluted with a solvent such that the diluted ink filled in a Zahn cup No. 4 flowed down over 11 to 13 seconds, and the diluted ink was printed on a coated paper sheet and measured for a color with a colorimeter. The obtained data was expressed by $\Delta a^*$ of CIELAB color specification system ($\Delta a^*=0$: the same hue, +side: an increase in reddish hue, −side: an increase in bluish hue).

Gloss

The printing with the ink prepared for the evaluation of hue was measured for a gloss with a gloss meter.

Tinting strength 5.0 Grams of a blue ink was mixed with 30.0 g of a white ink containing titanium oxide to prepare a blue cut ink, and 5.0 g of the full shade ink prepared for the evaluation of dispersibility and 35.0 g of the blue cut ink were mixed to prepare a tinting cut ink. The so-prepared tinting cut ink was printed on a coated paper sheet and measured for a color with a colorimeter. The obtained data was expressed by H° of CIELAB color specification system (the greater the H° value is, the more bluish the color is, and the lower the tinting strength is).

Dispersibility

A sample having a predetermined composition was dispersed with a paint shaker for 5, 10, 15, 20, 30, 45 and 60 minutes to prepare inks for the evaluation of dispersibility. These inks were measured for a state of ground pigment with a grind gage (GR value: smaller the better).

Table 1 shows the results of evaluations of the pigments in the form of an offset ink, and Table 2 shows the results of evaluations of the pigments in the form of a gravure ink.

TABLE 1

|  | Dispersibility after treatment with 3-roll mil three times GR value | Tinting strength H° | Gloss 60° gloss % |
|---|---|---|---|
| Ex. 1 | 2.5 | 3.23 G | 41 |
| Ex. 2 | 3.5 | 3.44 G | 44 |
| Ex. 3 | 3.7 | 3.29 G | 38 |
| Ex. 4 | 2.8 | 3.31 G | 42 |
| CEx. 1 | 4.0 | 3.68 G | 37 |
| CEx. 2 | 4.2 | 3.26 G | 37 |
| CEx. 3 | 6.0 | 3.83 G | 35 |
| CEx. 4 | 5.0 | 3.69 G | 41 |
| CEx. 5 | 3.0 | 3.74 G | 36 |

Ex. = Example, CEx. = Comparative Example

TABLE 2

|  | Hue $\Delta a^*$ | Gloss 60° gloss % | Tinting strength H° | Dispersibility Dispersing time (minute) | | | |
|---|---|---|---|---|---|---|---|
|  |  |  |  | 15 | 30 | 45 | 60 |
| Ex. 1 | 0.8 | 86 | 3.58 G | 20 | 14 | 6 | — |
| Ex. 2 | 0.5 | 103 | 3.93 G | 23 | 16 | 9 | — |
| Ex. 3 | 0.2 | 98 | 3.33 G | 21 | 13 | 9 | — |
| Ex. 4 | 0.4 | 93 | 3.35 G | 20 | 12 | 7 | — |

TABLE 2-continued

|  | Hue | Gloss 60° | Tinting strength | Dispersibility Dispersing time (minute) | | | |
|---|---|---|---|---|---|---|---|
|  | Δa* | gloss % | H° | 15 | 30 | 45 | 60 |
| CEx. 1 | 3.1 | 116 | 4.12 G | 25> | 19 | 12 | 8 |
| CEx. 2 | 0.1 | 73 | 7.71 G | 21 | 14 | 7 | — |
| CEx. 3 | 2.8 | 113 | 4.95 G | 25> | 20 | 18 | 13 |
| CEx. 4 | 0.8 | 103 | 4.43 G | 25> | 16 | 10 | 7 |
| CEx. 5 | 0.3 | 91 | 4.68 G | 25 | 18 | 11 | 9 |

Ex. = Example, CEx. = Comparative Example

It has not been possible to heat a synthesized dis-azo pigment at a high temperature due to its poor heat resistance, while the process for the production of a dis-azo pigment according to the present invention makes it possible to dry a synthesized dis-azo pigment at a high temperature.

Further, when a synthesized dis-azo pigment is dried with hot air at a high temperature, the resultant dis-azo pigment has a product quality different from that of a dis-azo pigment obtained by drying a synthesized dis-azo pigment at a low temperature for a long period of time. The present invention employs the first step of removing water from formed fine particles to form a powder and the second step of keeping the powder under heat at a relatively low temperature for a relatively lone period of time, whereby the resultant dis-azo pigment has a product quality equivalent to, or higher than, that of a dis-azo pigment obtained by drying a synthesized dis-azo pigment at a low temperature for a long period of time.

Moreover, a conventional process for the production of a dis-azo pigment requires the drying and pulverization steps, while the process of the present invention enables the production of a dis-azo pigment in the form of a powder since a synthesized dis-azo pigment is instantaneously dried while forming it into fine particles. Therefore, the present invention does not require the pulverization step, and improves the production process to a great extent. Further, the time required for the production of a dis-azo pigment as a product is decreased.

What is claimed is:

1. A process for the production of a dis-azo pigment, which comprises (a) a first step of forming an aqueous paste or slurry containing a synthesized dis-azo pigment into fine particles under hot air at 100° to 300° C. for a short period of time within 0.5 hour, and at the same time, removing water from the formed fine particles to form a powder, and (b) a second step of keeping the powder under heat at 50° to 150° C. for 0.5 to 10 hours.

2. A process according to claim 1, wherein the aqueous slurry or paste has a water content of 50 to 1,000% by weight on a dry basis.

3. A process according to claim 1, wherein, in the first step, water is removed with a means having both a means of forming fine particles and a means of drying the fine particles with hot air.

4. A process according to claim 1, wherein, in the first step, water is removed with a dryer selected from the group consisting of a spray dryer, an air-circulating dryer and a fluidized bed dryer.

5. A process according to claim 1, wherein, in the first step 1, the hot air has a temperature in the range of from 180° to 300° C.

6. A process according to claim 1, wherein, in the first step, water is removed within 5 minutes.

7. A process according to claim 1, wherein, in the first step, water is removed until the powder has a water content of 0.1 to 5% by weight on a dry basis.

* * * * *